(12) United States Patent
Wang

(10) Patent No.: US 11,162,612 B2
(45) Date of Patent: Nov. 2, 2021

(54) DEVICE FOR ACTIVITY TEST OF EXTRACTION CHECK VALVE

(71) Applicant: Ningxia Danchen Technology Co., LTD, Yinchuan (CN)

(72) Inventor: Jisheng Wang, Yinchuan (CN)

(73) Assignee: Ningxia Danchen Technology Co., LTD, Yinchuan (CN)

( * ) Notice: Subject to any disclaimer, the term of this patent is extended or adjusted under 35 U.S.C. 154(b) by 224 days.

(21) Appl. No.: 16/569,171

(22) Filed: Sep. 12, 2019

(65) Prior Publication Data

US 2020/0326016 A1      Oct. 15, 2020

(30) Foreign Application Priority Data

Apr. 11, 2019   (CN) .......................... 201910288191.9

(51) Int. Cl.
| | |
|---|---|
| *F16K 37/00* | (2006.01) |
| *F16K 15/03* | (2006.01) |
| *F16K 17/10* | (2006.01) |
| *F16K 15/18* | (2006.01) |
| *F16K 31/05* | (2006.01) |
| *F16K 31/04* | (2006.01) |

(Continued)

(52) U.S. Cl.
CPC .......... *F16K 37/0075* (2013.01); *F01K 17/04* (2013.01); *F16K 15/033* (2013.01); *F16K 15/18* (2013.01); *F16K 17/10* (2013.01); *F16K 31/046* (2013.01); *F16K 31/05* (2013.01); *F16K 37/0083* (2013.01); *F16K 39/026* (2013.01); *Y10T 137/8671* (2015.04); *Y10T 137/86767* (2015.04); *Y10T 137/87185* (2015.04)

(58) Field of Classification Search
CPC ........ F16K 15/18; F16K 17/10; F16K 31/046; F16K 15/033; F16K 31/05; F16K 39/026; F16K 37/0075; F05D 2220/36; Y10T 137/8671; Y10T 137/86767; Y10T 137/87185; F01D 25/285; F01K 7/345; F01K 17/04

See application file for complete search history.

(56) References Cited

U.S. PATENT DOCUMENTS

| | | | | |
|---|---|---|---|---|
| 3,605,806 A | * | 9/1971 | Coatti ..................... | F15B 13/08 137/596.13 |
| 4,099,541 A | * | 7/1978 | Binkley .................. | F15B 13/08 137/596.13 |

(Continued)

*Primary Examiner* — Atif H Chaudry
(74) *Attorney, Agent, or Firm* — Harness, Dickey & Pierce, P.L.C.

(57) ABSTRACT

The device includes a main valve, first and second auxiliary valves, a valve body and a filter. The main, which has first and second auxiliary valves are mounted on the valve body, which has an air inlet, a cylinder port and an air discharging port. The air inlet is in communication with the main valve through a first air passage, the cylinder port is sequentially in communication with the first and second auxiliary valves, and the main valve through a second air passage. The air discharging port is sequentially in communication with the first and second auxiliary valves and the main valve through a third air passage. The main and the second auxiliary valves are solenoid valves, and the first auxiliary valve is a hand-operated valve. An air outlet of the filter is in communication with the air inlet. The filter is used for filtering out impurities in gas.

9 Claims, 2 Drawing Sheets

(51) Int. Cl.
*F16K 39/02* (2006.01)
*F01K 17/04* (2006.01)

(56) References Cited

U.S. PATENT DOCUMENTS

| | | | | |
|---|---|---|---|---|
| 4,353,390 A | * | 10/1982 | Karpenko | F16K 15/03 137/527.8 |
| 4,589,437 A | * | 5/1986 | Zeuner | F15B 13/0402 137/115.03 |
| 5,131,514 A | * | 7/1992 | Machida | F16D 25/14 192/85.63 |

* cited by examiner

DEVICE FOR ACTIVITY TEST OF EXTRACTION CHECK VALVE

CROSS-REFERENCE TO RELATED APPLICATIONS

This application claims priority to Chinese application number 201910288191.9, filed Apr. 11 2019, with a title of DEVICE FOR ACTIVITY TEST OF EXTRACTION CHECK VALVE. The above-mentioned patent application is incorporated herein by reference in its entirety.

FIELD

The present disclosure relates to the technical field of activity test devices, and in particular to a device for an activity test of an extraction check valve.

BACKGROUND

An extraction check valve is a valve device that is installed on a steam extraction pipe of a steam turbine to prevent steam in a heater or a heat pipe from returning to the steam turbine to cause a galloping accident when a generator trips out and a main air valve is switched off, and at the same time prevents feed water from entering the steam turbine from the steam extraction pipe to cause a water hammer accident when a copper pipe of the heater leaks. The valve is a key valve for protecting the steam turbine. The valve is switched off by means of a single-acting cylinder. When the single-acting cylinder is in a working state, a spring thereof is in a compressed state for a long time under the pressure of the air pressure. When the spring is in the compressed state for a long time, fatigue will occur and the spring will lose elasticity. In addition, the single-acting cylinder is inactive for a long time and is prone to jams. In order to ensure the reliability of the cylinder, it becomes extremely important to prevent the cylinder spring from failing, and to find out in time that the spring force is insufficient and the cylinder is stuck. For the safety of the steam turbine, under normal circumstances, the extraction check valve should be tested at least once in one month. An existing method is to add a hand-operated valve besides the solenoid valve for controlling the single-acting cylinder as the bypass decompression to do the activity test. The hand-operated valve limits the activity test, so that the activity test can only be carried out locally, which cannot meet the remote intelligent operation of a smart power plant. Moreover, due to the low cleanliness of the gas delivered by an air source, the device for an activity test is prone to blockage and needs to be cleaned frequently, which is very inconvenient to use.

Therefore, it is an urgent problem to be solved how to provide a device for an activity test device extraction check valve which can meet the requirements for remote intelligent operation of a smart power plant, is not prone to blockage and is convenient to use.

SUMMARY

The An objective of the present disclosure is to provide a device for an activity test of an extraction check valve to solve the above problems in the prior art, so that the activity test of the extraction check valve can be operated remotely, is not prone to blockage and is convenient to use.

To achieve the above purpose, the present disclosure provides the following technical solution.

A device for an activity test of an extraction check valve includes a main valve, a first auxiliary valve, a second auxiliary valve, a valve body and a filter, where the main valve, the first auxiliary valve and the second auxiliary valve are mounted on the valve body, and the valve body is provided with an air inlet, a cylinder port and an air discharging port, the air inlet is in communication with the main valve through a first air passage, the cylinder port is sequentially in communication with the second auxiliary valve, the first auxiliary valve and the main valve through a second air passage, and the air discharging port is sequentially in communication with the second auxiliary valve, the first auxiliary valve and the main valve through a third air passage; the main valve and the second auxiliary valve are solenoid valves, and the first auxiliary valve is a hand-operated valve; an air outlet of the filter is in communication with the air inlet, and the filter is used for filtering out impurities in gas.

Preferably, the device for an activity test of an extraction check valve further includes a filtering pressure-reducing valve and a needle valve, where the needle valve, the filtering pressure-reducing valve, the filter and the air inlet are sequentially in communication with each other.

Preferably, the device for an activity test of an extraction check valve further includes a movable bracket, where the movable bracket is connected to the ground through a foundation bolt, and the valve body is fixed on the movable bracket.

Preferably, the main valve includes a main valve sleeve, a main valve core and a first drive coil; the first drive coil is disposed on one side of the valve body, the first drive coil is used for driving the main valve core to move, the main valve sleeve is disposed inside the valve body, and the main valve core is disposed inside the main valve sleeve; the first air passage, the second air passage and the third air passage are in communication with the main valve sleeve, two first shoulders are disposed on the outer surface of the main valve core in the axial direction of the main valve core, and the outer surface of each of the first shoulders is attached to the inner surface of the main valve sleeve.

Preferably, a first spring is disposed between the inner bottom end of the main valve sleeve and the main valve core.

Preferably, the first auxiliary valve includes a first auxiliary valve sleeve and a first auxiliary valve core, the first auxiliary valve sleeve is disposed inside the valve body, one end of the first auxiliary valve core extends into the auxiliary valve sleeve, the first auxiliary valve sleeve is in communication with the second air passage and the third air passage, two second shoulders are disposed on the outer surface of the first auxiliary valve core in the axial direction of the first auxiliary valve core, and the outer surface of each of the second shoulders is attached to the inner surface of the first auxiliary valve sleeve.

Preferably, one side of the valve body is provided with a limiting cavity, the other end of the first auxiliary valve core is connected to a manual push rod, the manual push rod passes through the limiting cavity and extends out, a limiting block is circumferentially disposed on the outer surface of the manual push rod, and the limiting block is clamped in the limiting cavity; the first auxiliary valve further includes a second spring and a third spring, where the second spring is disposed between the inner bottom end of the first auxiliary valve sleeve and the first auxiliary valve core, the manual push rod is sleeved with the third spring, and the third spring is disposed between the inner bottom end of the limiting cavity and the limiting block.

Preferably, the second auxiliary valve includes a second auxiliary valve sleeve, a second auxiliary valve core and a second drive coil, where the second drive coil is disposed on one side of the valve body, the second drive coil is used for driving the second auxiliary valve core to move, the second auxiliary valve sleeve is disposed inside the valve body, the second auxiliary valve core is disposed inside the second auxiliary valve sleeve, the second auxiliary valve sleeve is in communication with the second air passage and the third air passage; two third shoulders are disposed on the outer surface of the second auxiliary valve core in the axial direction of the second auxiliary valve core, and the outer surface of each of the third shoulders is attached to the inner surface of the second auxiliary valve sleeve.

Preferably, the second auxiliary valve includes a fourth spring, and the fourth spring is disposed between the inner bottom end of the second auxiliary valve sleeve and the second auxiliary valve core.

Compared with the prior art, the present disclosure achieves the following technical effects:

The device for an activity test of an extraction check valve provided by the present disclosure is provided with a first auxiliary valve and a second auxiliary valve. The first auxiliary valve is a hand-operated valve, and the second auxiliary valve is a solenoid valve. Local operation is performed manually while remote operation is performed electrically. The device for an activity test of an extraction check valve can be operated locally and can also be operated remotely, has multiple functions, is convenient to use and can meet the requirements for a smart power plant. At the same time, the device for an activity test of an extraction check valve is provided with a filter, and gas is filtered through the filter and then enters the device for an activity test of an extraction check valve, thereby effectively avoiding the situation that the gas contains impurities, which cause blockage of the device, and the device is reliable, safe and convenient to use.

BRIEF DESCRIPTION OF THE DRAWINGS

To describe the technical solutions in the examples of the present disclosure or in the prior art more clearly, the following briefly describes the accompanying drawings required for describing the examples. Apparently, the accompanying drawings in the following description show some examples of the present disclosure, and a person of ordinary skill in the art may still derive other drawings from these accompanying drawings without creative efforts.

In FIGS. 1 to 2:

1. air inlet pipe, 2. needle valve, 3. filtering pressure-reducing valve, 4. filter, 5. third air passage, 6. main valve, 601. first drive coil, 602. main valve core, 603. first shoulder, 604. first spring, 605. main valve sleeve, 7. first auxiliary valve, 701. first auxiliary valve core, 702. first auxiliary valve sleeve, 703. second shoulder, 704. limiting cavity, 705. manual push rod, 706. limiting block, 707. second spring, 708. third spring, 8. second auxiliary valve, 801. second drive coil, 802. second auxiliary valve sleeve, 803. second auxiliary valve core, 804. third shoulder, 805. fourth spring, 9. movable bracket, 10. air inlet cylinder pipe, 11. valve body, 12. first air passage, 13. second air passage.

DETAILED DESCRIPTION

The following clearly and completely describes the technical solutions in the examples of the present disclosure with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

An objective of the present disclosure is to provide a device for an activity test of an extraction check valve to solve the above problems in the prior art, so that the activity test of the extraction check valve can be operated remotely, is not prone to blockage and is reliable, safe and convenient to use.

To make the foregoing objective, features, and advantages of the present disclosure clearer and more comprehensible, the present disclosure is further described in detail below with reference to the accompanying drawings and specific examples.

EXAMPLE 1

Figure 1:
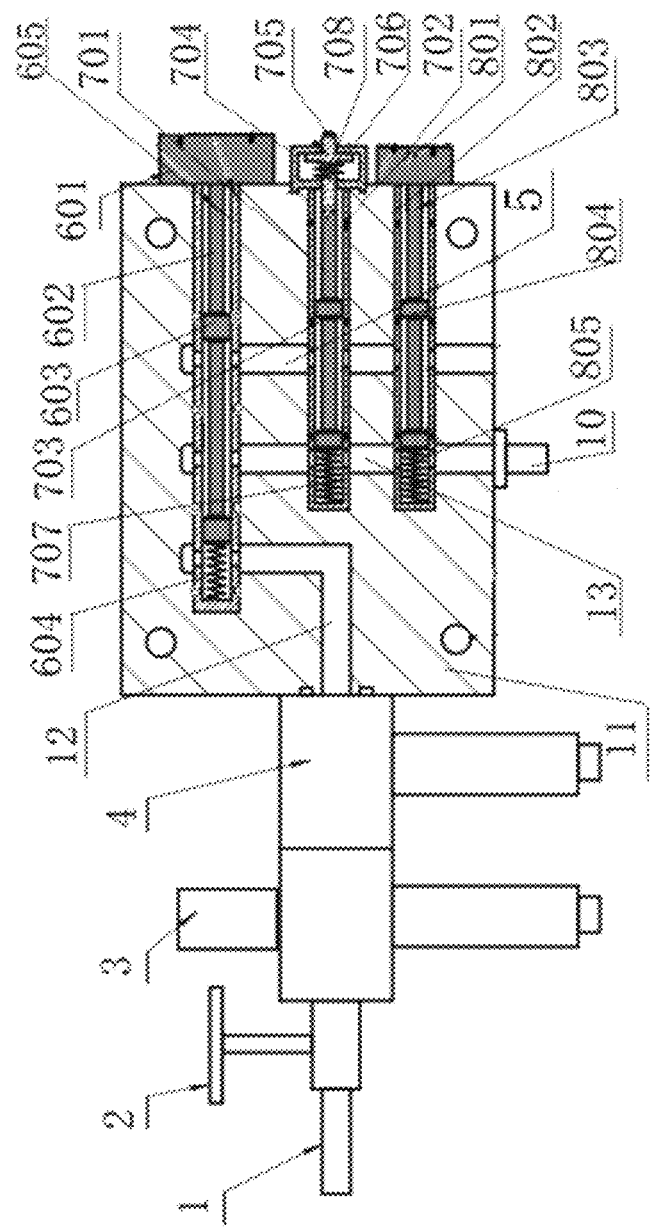
FIG. 1 is a schematic view showing the internal structure of a device for an activity test of an extraction check valve provided by the present disclosure.

As shown in FIG. 1, this example provides a device for an activity test of an extraction check valve, including a main valve 6, a first auxiliary valve 7, a second auxiliary valve 8, a valve body 11 and a filter 4, where the main valve 6, the first auxiliary valve 7 and the second auxiliary valve 8 are mounted on the valve body 11. Preferably, the main valve 6, the first auxiliary valve 7 and the second auxiliary valve 8 are parallel to each other. The valve body 11 is provided with an air inlet, a cylinder port and an air discharging port; the air inlet is in communication with the main valve 6 through a first air passage 12, the cylinder port is sequentially in communication with the second auxiliary valve 8, the first auxiliary valve 7 and the main valve 6 through a second air passage 13, and the air discharging port is sequentially in communication with the second auxiliary valve 8, the first auxiliary valve 7 and the main valve 6 through a third air passage 5. The main valve 6 and the second auxiliary valve 8 are solenoid valves, and the first auxiliary valve 7 is a hand-operated valve. An air outlet of the filter 4 is in communication with the air inlet, and the filter 4 is used for filtering out impurities in the gas. Through the arrangement of the second auxiliary valve 8, the device for an activity test of an extraction check valve can achieve the remote activity test. The device for an activity test of an extraction check valve can be locally operated and can also be remotely operated, has various functions, is convenient to use, and can meet the requirements for a smart power plant. At the same time, gas is filtered through the filter 4 and then enters the device for an activity test of an extraction check valve, thereby effectively avoiding the situation that the gas contains impurities, which cause blockage of the device, and the device is reliable, safe and convenient to use.

In specific use, the air inlet is in communication with an air source, the cylinder port is in communication with the air inlet position of a single-acting cylinder. When a local activity test is required, the hand-operated valve acts while the main valve operates, and the second air passage 13 is in communication with the third air passage 5 by gas through the first auxiliary valve. Some gas is discharged, the cylinder pressure is reduced, and a cylinder piston rod operates in a direction in which the extraction check valve is switched off. When the piston rod descends to one-third of the length of a main valve rod, the hand-operated valve is loosened, the first auxiliary valve returns, and the second air passage 13 and the third air passage 5 are in a closed state. At this time, the cylinder piston rod operates in a direction in which the extraction check valve is switched on, and the manual activity test ends. When a remote activity test is required, while the main valve operates, the second auxiliary valve solenoid valve is energized, so that the second auxiliary valve acts; the second air passage 13 is in communication with the third air passage 5 by gas through the second auxiliary valve. Some gas is discharged, the cylinder pressure is reduced, and a cylinder piston rod operates in a direction in which the extraction check valve is switched off. When the piston rod descends to one-third of the length of the main valve rod, the second auxiliary valve solenoid valve is powered off and returns, and the second air passage 13 and the third air passage 5 are in a closed state. At this time, the cylinder piston rod operates in a direction in which the extraction check valve is switched on, and the remote activity test ends.

In some examples, the device for an activity test of an extraction check valve further includes a filtering pressure-reducing valve 3 and a needle valve 2. The needle valve 2, the filtering pressure-reducing valve 3, a filter 4 and an air inlet are sequentially in communication with each other. Specifically, the needle valve 2 is connected with the filtering pressure-reducing valve 3 through a loose joint, the filtering pressure-reducing valve 3 is connected with the filter 4 through a bolt and an O-shaped seal ring, the filter 4 is connected with the air inlet through a bolt and an O-shaped seal ring, and the arrangement of the needle valve 2, the filtering pressure-reducing valve 3 and the filter 4 ensures constant flow, constant pressure and cleanliness of test gas.

In some examples, the device for an activity test of an extraction check valve further includes an air inlet pipe 1 and an air inlet cylinder pipe 10, the needle valve 2 is in communication with an air source through the air inlet pipe 1, the air inlet pipe 1 is connected with an air source welding joint, the cylinder port is in communication with the single-acting cylinder through the air inlet cylinder pipe 10, and the air inlet cylinder pipe 10 is connected with the single-acting cylinder through a welding joint.

Figure 2:
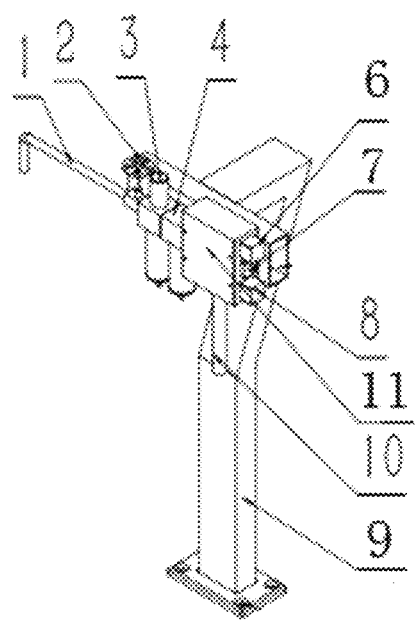
FIG. 2 is a schematic view showing the assembly structure of a device for an activity test of an extraction check valve provided by the present disclosure.

In some examples, as shown in FIG. 2, the device for an activity test of an extraction check valve further includes a movable bracket 9, the movable bracket 9 is connected with the ground through a foundation bolt, and the valve body 11 is fixed on the movable bracket 9. Through the arrangement of the movable bracket 9, the device meets the requirements of ergonomics and is convenient to operate, good in stability and convenient to maintain and fix.

In some examples, the main valve 6 includes a main valve sleeve 605, a main valve core 602 and a first drive coil 601. The first drive coil 601 is disposed on one side of the valve body 11, the first drive coil 601 is used for driving the main valve core 602 to move, the main valve sleeve 605 is disposed inside the valve body 11, and the main valve core 602 is disposed inside the main valve sleeve 605; the third air passage 12, the second air passage 13 and the third air passage 5 are in communication with the main valve sleeve 605, two first shoulders 603 are disposed on the outer surface of the main valve core 602 in the axial direction of the main valve core 602, and the outer surface of each of the first shoulders 603 is attached to the inner surface of the main valve sleeve 605.

In specific use, the first drive coil 601 drives the main valve core 602 to move, the position of the first shoulder 603 inside the main valve core 602 changes, and the first shoulder 603 is used for switching the moving direction of airflow, so that the airflow passes through the main valve sleeve 605 and enters the second air passage 13 or the third air passage 5.

In some examples, a first spring 604 is disposed between the inner bottom end of the main valve sleeve 605 and the main valve core 602. In this way, the main valve core 602 can return quickly and accurately.

In some examples, the first auxiliary valve 7 includes a first auxiliary valve sleeve 702 and a first auxiliary valve core 701, where the first auxiliary valve sleeve 702 is disposed inside the valve body 11, one end of the first auxiliary valve core 701 extends into the auxiliary valve sleeve, the first auxiliary valve sleeve 702 is in communication with the second air passage 13 and the third air passage 5, two second shoulders 703 are disposed on the outer surface of the first auxiliary valve core 701 in the axial direction of the first auxiliary valve core 701, and the outer surface of each of the second shoulders 703 is attached to the inner surface of the first auxiliary valve sleeve 702.

In specific use, the first auxiliary valve core 701 is manually pushed to move, and the position of the second shoulder 703 inside the first auxiliary valve core 701 changes. The second shoulder 703 is used for switching the moving direction of airflow, so that the airflow passes through the first auxiliary valve sleeve 702 and enters the second air passage 13 or the third air passage 5.

In some examples, one side of the valve body 11 is provided with a limiting cavity 704, the other end of the first auxiliary valve core 701 is connected to a manual push rod 705, the manual push rod 705 passes through the limiting cavity 704 and extends out, a limiting block 706 is circumferentially disposed on the outer surface of the manual push rod 705, and the limiting block 706 is clamped in the limiting cavity 704.

In specific use, the first auxiliary valve core 701 moves to drive the limiting block 706 to move in the limiting cavity 704, the limiting cavity 704 is used for limiting the axial movement of the first auxiliary valve core 701 to prevent the first auxiliary valve core 701 from being disengaged from the first auxiliary valve sleeve 702.

In some examples, the first auxiliary valve 7 further includes a second spring 707 and a third spring 708, where the second spring 707 is disposed between the inner bottom end of the first auxiliary valve sleeve 702 and the first auxiliary valve core 701, the manual push rod 705 is sleeved with the third spring 708, and the third spring 708 is disposed between the inner bottom end of the limiting cavity 704 and the limiting block 706. In this way, the first auxiliary valve core 701 can return quickly and accurately, and the arrangement of the dual springs ensures that the first auxiliary valve core 701 returns more quickly.

In some examples, the second auxiliary valve 8 includes a second auxiliary valve sleeve 802, a second auxiliary valve core 803 and a second drive coil 801, where the second drive coil 801 is disposed on one side of the valve body 11, the second drive coil 801 is used for driving the second auxiliary valve core 803 to move, the second auxiliary valve sleeve 802 is disposed inside the valve body 11, the second auxiliary valve core 803 is disposed inside the second auxiliary valve sleeve 802, and the second auxiliary valve sleeve 802 is in communication with the second air passage 13 and the third air passage 5; two third shoulders 804 are disposed on the outer surface of the second auxiliary valve core 803 in the axial direction of the second auxiliary valve core 803, and the outer surface of each of the third shoulders 804 is attached to the inner surface of the second auxiliary valve sleeve 802.

In specific use, the second drive coil 801 drives the second auxiliary valve core 803 to move, the position of the third shoulder 804 inside the second auxiliary valve core 803 changes, and the third shoulder 804 is used for switching the moving direction of airflow, so that the airflow passes through the second auxiliary valve sleeve 802 and enters the second air passage 13 or the third air passage 5.

In some examples, the second auxiliary valve 8 includes a fourth spring 805, the fourth spring 805 is disposed between the inner bottom end of the second auxiliary valve sleeve 802 and the second auxiliary valve core 803, such that the second auxiliary valve core 803 can return quickly and accurately.

In some examples, the main valve sleeve 605, the first auxiliary valve sleeve 702 and the second auxiliary valve sleeve 802 are mounted in the valve body 11 through an O-shaped seal ring, the surfaces of the main valve core 602, the first auxiliary valve core 701 and the second auxiliary valve core 803 are polished. In this way, the device is sealed closely and is good in air tightness.

In addition, the devices or components of different functions in the above various examples may be combined. For example, the device for an activity test of an extraction check valve in a preferred example of the present disclosure includes a main valve 6, a first auxiliary valve 7, a second auxiliary valve 8, a valve body 11, a filtering pressure-reducing valve 3, a needle valve 2, a movable bracket 9, and a filter 4, where the main valve 6, the first auxiliary valve 7 and the second auxiliary valve 8 are mounted on the valve body 11; the main valve 6, the first auxiliary valve 7 and the second auxiliary valve 8 are parallel to each other, and the valve body 11 is provided with an air inlet, a cylinder port and an air discharging port; the needle valve 2, the filtering pressure-reducing valve 3, the filter 4 and the air inlet are sequentially in communication; the filter 4 is used for filtering out impurities in gas; the needle valve 2 is connected with the filtering pressure-reducing valve 3 through a loose joint, and the filtering pressure-reducing valve 3 is connected with the filter 4 through a bolt and an O-shaped seal ring. The filter 4 is connected with the air inlet through a bolt and an O-shaped seal ring, the needle valve 2 is in communication with an air source through an air inlet pipe 1, the air inlet pipe 1 is welded to the air source, the cylinder port is in communication with a single-acting cylinder through an air inlet cylinder pipe 10, the air inlet cylinder pipe 10 is connected to the single-acting cylinder by welding, and the movable bracket 9 is connected to the ground through a foundation bolt, and the valve body 11 is fixed on the movable bracket 9. The main valve 6 includes a main valve sleeve 605, a main valve core 602 and a first drive coil 601. The first drive coil 601 is disposed on one side of the valve body 11, the first drive coil 601 is used for driving the main valve core 602 to move, the main valve sleeve 605 is mounted inside the valve body 11 through an O-shaped seal ring, and the main valve core 602 is disposed inside the main valve sleeve 605. Two first shoulders 603 are disposed on the outer surface of the main valve core 602 in the axial direction of the main valve core 602, and the outer surface of each of the first shoulders 603 is attached to the inner surface of the main valve sleeve 605. The surface of the main valve core 602 is polished. A first spring 604 is disposed between the inner bottom end of the main valve sleeve 605 and the main valve core 602. The first auxiliary valve 7 includes a first auxiliary valve sleeve 702 and a first auxiliary valve core 701, where the first auxiliary valve sleeve 702 is mounted inside the valve body 11 through an O-shaped seal ring, and one end of the first auxiliary valve core 701 extends into the auxiliary valve sleeve. Two second shoulders 703 are disposed on the outer surface of the first auxiliary valve core 701 in the axial direction of the first auxiliary valve core 701, and the outer surface of each of the second shoulders 703 is attached to the inner surface of the first auxiliary valve sleeve 702. The surface of the first auxiliary valve core 701 is polished. One side of the valve body 11 is provided with a limiting cavity 704, the other end of the first auxiliary valve core 701 is connected to a manual push rod 705, the manual push rod 705 passes through the limiting cavity 704 and extends out, a limiting block 706 is circumferentially disposed on the outer surface of the manual push rod 705, and the limiting block 706 is clamped in the limiting cavity 704. The first auxiliary valve 7 further includes a second spring 707 and a third spring 708, where the second spring 707 is disposed between the inner bottom end of the first auxiliary valve sleeve 702 and the first auxiliary valve core 701. The first auxiliary valve core 701 is sleeved with and the third spring 708, and the third spring 708 is disposed between the inner bottom end of the limiting cavity 704 and the limiting block 706. The second auxiliary valve 8 includes a second auxiliary valve sleeve 802, a second auxiliary valve core 803 and a second drive coil 801, where the second drive coil 801 is disposed on one side of the valve body 11, and the second drive coil 801 is used for driving the second auxiliary valve core 803 to move. The second auxiliary valve 8 is mounted inside the valve body 11 through a seal ring, the second auxiliary valve core 803 is disposed inside the second auxiliary valve sleeve 802, and the second auxiliary valve sleeve 802 is in communication with a second air passage 13 and a third air passage 5. Two third shoulders 804 are disposed on the outer surface of the second auxiliary valve core 803 in the axial direction of the second auxiliary valve core 803, and the outer surface of each of the third shoulders 804 is attached to the inner surface of the second auxiliary valve sleeve 802. The surface of the second auxiliary valve core 803 is polished. The second auxiliary valve 8 includes a fourth spring 805, and the fourth spring 805 is disposed between the inner bottom end of the second auxiliary valve sleeve 802 and the second auxiliary valve core 803. The air inlet is in communication with the main valve sleeve 605 through a first air passage 12. The cylinder port is sequentially in communication with the second auxiliary valve sleeve 802, the first auxiliary valve sleeve 702 and the main valve sleeve 605 through the second air passage 13, and the air discharging port is sequentially in communication with the second auxiliary valve sleeve 802, the first auxiliary valve sleeve 702 and the main valve sleeve 605 through the third air passage 5.

It should be noted that when the main valve sleeve 605 is arranged in a manner as shown in FIG. 1, a left end thereof is a bottom end; when the first auxiliary valve sleeve 702 is arranged in a manner as shown in FIG. 1, a left end thereof is a bottom end; and when the second auxiliary valve sleeve 802 is arranged in a manner as shown in FIG. 1, a left end thereof is a bottom end.

Several examples are used for illustration of the principles and implementation methods of the present disclosure. The description of the examples is used to help illustrate the method and its core principles of the present disclosure. In addition, those skilled in the art can make various modifications in terms of specific examples and scope of application in accordance with the teachings of the present disclosure. In conclusion, the content of this specification shall not be construed as a limitation to the present disclosure.

What is claimed is:

1. A device for an activity test of an extraction check valve, comprising:
   a main valve;
   a first auxiliary valve;
   a second auxiliary valve;
   a valve body; and
   a filter;
   wherein the main valve, the first auxiliary valve and the second auxiliary valve are mounted on the valve body, and the valve body is provided with an air inlet, a cylinder port and an air discharging port, the air inlet is in communication with the main valve through a first air passage, the cylinder port is sequentially in communication with the second auxiliary valve, the first auxiliary valve and the main valve through a second air passage, and the air discharging port is sequentially in communication with the second auxiliary valve, the first auxiliary valve and the main valve through a third air passage; the main valve and the second auxiliary valve are solenoid valves, and the first auxiliary valve is a hand-operated valve; an air outlet of the filter is in communication with the air inlet, and the filter is used for filtering out impurities in gas.

2. The device for the activity test of the extraction check valve according to claim 1, further comprising a filtering pressure-reducing valve and a needle valve, wherein the needle valve, the filtering pressure-reducing valve, the filter and the air inlet are sequentially in communication with each other.

3. The device for the activity test device of the extraction check valve according to claim 1, further comprising a movable bracket, wherein the movable bracket is connected to a ground through a foundation bolt, and the valve body is fixed on the movable bracket.

4. The device for the activity test of the extraction check valve according to claim 1, wherein the main valve comprises a main valve sleeve, a main valve core and a first drive coil; the first drive coil is disposed on one side of the valve body, the first drive coil is used for driving the main valve core to move, the main valve sleeve is disposed inside the valve body, and the main valve core is disposed inside the main valve sleeve; the first air passage, the second air passage and the third air passage are in communication with the main valve sleeve, two first shoulders are disposed on an outer surface of the main valve core in an axial direction of the main valve core, and an outer surface of each of the first shoulders is attached to an inner surface of the main valve sleeve.

5. The device for the activity test device of the extraction check valve according to claim 4, wherein a first spring is disposed between an inner bottom end of the main valve sleeve and the main valve core.

6. The device for the activity test of the extraction check valve according to claim 1, wherein the first auxiliary valve comprises a first auxiliary valve sleeve and a first auxiliary valve core, the first auxiliary valve sleeve is disposed inside the valve body, one end of the first auxiliary valve core extends into the auxiliary valve sleeve, the first auxiliary valve sleeve is in communication with the second air passage and the third air passage, two second shoulders are disposed on an outer surface of the first auxiliary valve core in an axial direction of the first auxiliary valve core, and an outer surface of each of the second shoulders is attached to an inner surface of the first auxiliary valve sleeve.

7. The device for the activity test of the extraction check valve according to claim 6, wherein one side of the valve body is provided with a limiting cavity, the other end of the first auxiliary valve core is connected to a manual push rod, the manual push rod passes through the limiting cavity and extends out, a limiting block is circumferentially disposed on an outer surface of the manual push rod, and the limiting block is clamped in the limiting cavity; the first auxiliary valve further comprises a second spring and a third spring, wherein the second spring is disposed between an inner bottom end of the first auxiliary valve sleeve and the first auxiliary valve core, the manual push rod is sleeved with the third spring, and the third spring is disposed between an inner bottom end of the limiting cavity and the limiting block.

8. The device for the activity test of the extraction check valve according to claim 1, wherein the second auxiliary valve comprises a second auxiliary valve sleeve, a second auxiliary valve core and a second drive coil, wherein the second drive coil is disposed on one side of the valve body, the second drive coil is used for driving the second auxiliary valve core to move, the second auxiliary valve sleeve is disposed inside the valve body, the second auxiliary valve core is disposed inside the second auxiliary valve sleeve, the second auxiliary valve sleeve is in communication with the second air passage and the third air passage; two third shoulders are disposed on an outer surface of the second auxiliary valve core in an axial direction of the second auxiliary valve core, and an outer surface of each of the third shoulders is attached to an inner surface of the second auxiliary valve sleeve.

9. The device for the activity test of the extraction check valve according to claim 8, wherein the second auxiliary valve comprises a fourth spring, and the fourth spring is disposed between an inner bottom end of the second auxiliary valve sleeve and the second auxiliary valve core.

* * * * *